3,113,164
DEHYDROGENATION PROCESS AND RECOVERY OF THE RESULTING DEHYDROGENATED PRODUCTS

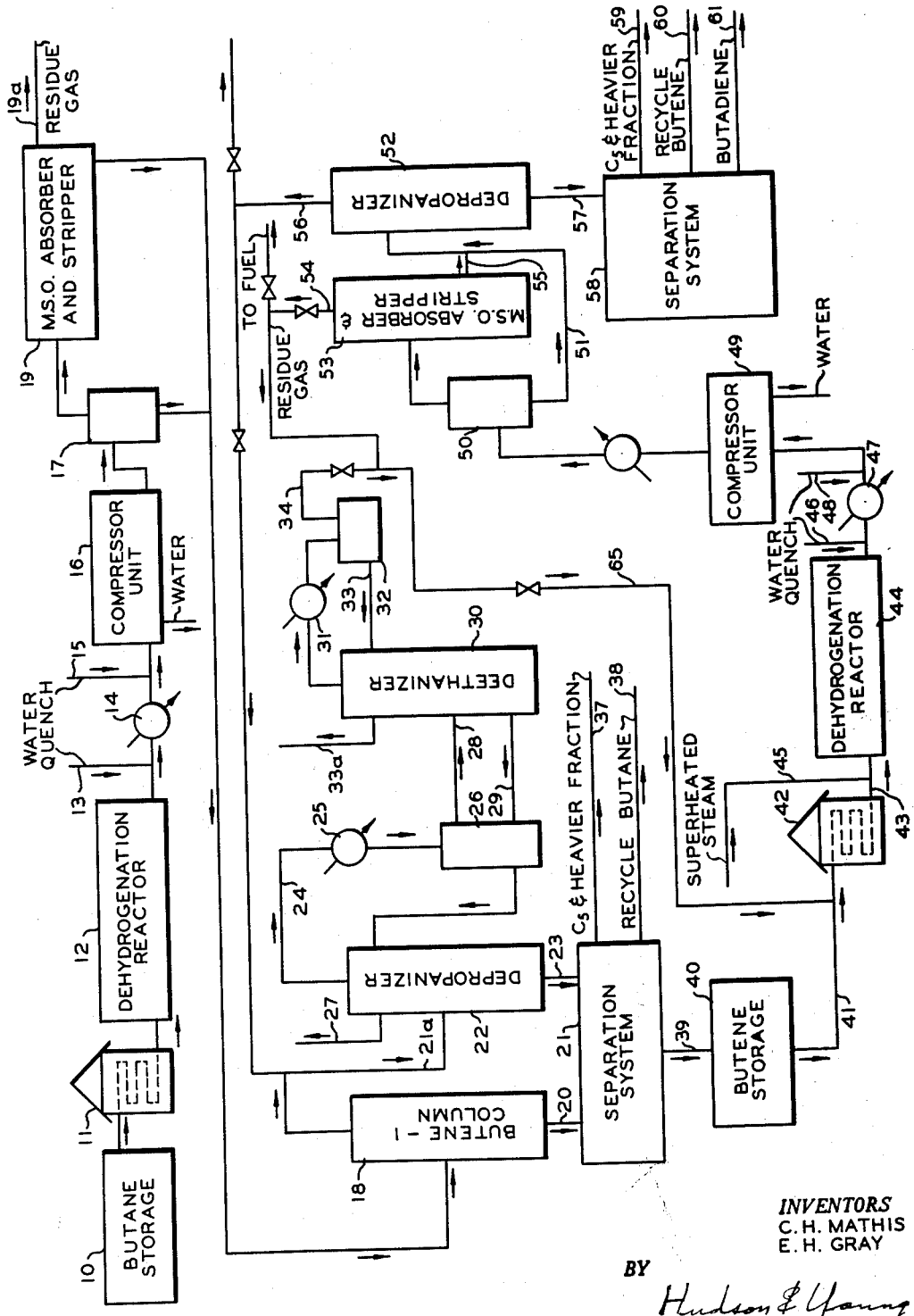

Clyde H. Mathis and Earl H. Gray, Borger, Tex., assignors to Phillips Petroleum Company, a corporation of Delaware
Filed June 20, 1955, Ser. No. 516,382
2 Claims. (Cl. 260—680)

This invention relates to a dehydrogenation process and recovery of the resulting dehydrogenated products.

In one commercial system for the manufacture of butadiene, butane is dehydrogenated to form butenes, and the butenes, in turn, are dehydrogenated to form butadiene. The second dehydrogenation step is carried out catalytically in the presence of an eighth group metal oxide catalyst promoted with an alkali or alkaline earth metal oxide or carbonate. Such catalysts are largely self-regenerating and permit steam to be admixed with the feed as a diluent material. However, adequate selectivity of the catalyst is difficult to maintain, particularly over extended periods of time.

We have discovered that when a selected residue gas fraction, which can be conveniently produced during the separation of butadiene from the dehydrogenation effluent, is admixed with the feed to the second dehydrogenation step, a substantial increase in catalyst selectivity results, and the life of the catalyst is greatly extended. Although all of the residue gas can be obtained during fractionation of the second dehydrogenation effluent, it is advantageous, in many instances, to obtain a portion of the aforesaid residue gas from the fractionation system which processes the effluent of the first dehydrogenation step. This results in a highly effective integrated process for the formation of butadiene from butane, and separation of the butadiene thus produced from other reaction products.

Accordingly, it is an object of the invention to provide an improved process for the dehydrogenation of butenes to form butadiene, and separation of the butadiene thus formed.

It is a further object to provide such a process in which the selectivity of the dehydrogenation catalyst is improved, and the catalyst life is extended.

It is a still further object to provide an integrated highly efficient process for the formation of butadiene from butane.

It is a still further object to provide a process which is economical in operation, and has a reduced investment in operating costs.

Various other objects, advantages and features of the invention will become apparent from the following detailed description taken in conjunction with the accompanying drawing, in which:

The FIGURE is a flow diagram of a butadiene plant constructed in accordance with the invention.

Referring now to the drawing in detail, butane is passed from a storage tank 10 through a heater 11 wherein it is heated to the temperature of 1100° F. at a pressure of 20 pounds per square inch. Unless otherwise noted, pressures given herein are gage pressures, and percentages are percentages by weight. The heated butane then passes into a dehydrogenation reactor 12 where it is catalytically reacted with any suitable catalyst for the dehydrogenation of butane to butenes. A suitable catalyst for this purpose is chromia alumina containing 89 percent alumina and 11 percent chromia, with a dehydrogenation temperature of 1050 to 1100° F.

The effluent from the reactor 12 is quenched to a temperature of 950° F. by water introduced through a quench line 13, the quenchted material passing through a waste heater boiler 14 where the temperature is reduced to 580° F. and then being subjected to a second quench to a temperature of 120° F. by water admitted through a quench line 15. The quenched effluent then passes through a compressor 16 to an accumulator 17 where it is separated into a vapor fraction and a liquid fraction, the accumulator being maintained at a temperature of 100° F. and a pressure of 200 pounds per square inch.

The liquid from the accumulator 17 is passed to a butene-1 column 18 as feed, while the gases from accumulator 17 are passed to a mineral seal oil absorber and stripper 19. Although the details of the unit 19 form no part of the invention, as those skilled in the art will understand, this unit can include an absorber wherein the incoming vapor is contacted with mineral seal oil entering at a temperature of 85° F. at a pressure of 180 pounds per square inch, the rich absorber oil being stripped in a column wherein the rich oil enters at a temperature of 250° F., the stripping vessel being operated at a pressure of 110 pounds per square inch and a bottom temperature of 360° F.

A residue gas from the absorber can be vented through a line 19a. The stripped material is admixed with the liquid discharged from accumulator 17 and passed as feed to the column 18.

In the column 18, butene-1 and higher boiling materials are withdrawn as a kettle product and passed through a line 20 to a separation system 21 while the overhead is passed through a line 21a to a depropanizer column 22. Suitable conditions for operation of the column 18 are a pressure of 160 pounds per square inch, a top temperature of 156° F., a bottom temperature of 194° F. and a feed temperature of 90° F.

A bottom product of $C_4$ hydrocarbons and higher boiling materials is withdrawn from column 22 and passed through a line 23 to separation system 21 while an overhead product is withdrawn through a line 24 and passed through a condenser 25 to a vessel 26. Suitable conditions for the column 22 are a feed temperature of 100° F., a bottom temperature of 235° F., and a pressure of 300 pounds per square inch. A liquified petroleum gas product is withdrawn through a line 27 adjacent the top of the column.

The vessel 26 is maintained at a pressure of 290 pounds per square inch, this vessel being connected by lines 28 and 29 to a deethanizer column 30 which is operated at a pressure of 290 pounds per square inch. The overhead of this column is passed through a butane refrigeration unit 31 to an accumulator 32, a portion of the material from the accumulator passing through a line 33 to the top of the column. A product can be withdrawn through a line 33a and returned to the vessel 17 by a line, not shown. A residue gas fraction is withdrawn through a line 34.

As noted, the bottoms product of columns 18 and 22 is passed to the separation system 21 where, by well understood techniques, there is produced a $C_5$ and heavier fraction which is withdrawn through a line 37, a recycle butane fraction which is withdrawn through a line 38, and a butene fraction which is withdrawn through a line 39 and passed to a butene storage unit 40.

The butene fraction is withdrawn from unit 40 through a line 41 and passed through a heater 42 and a line 43 to a dehydrogenation reactor 44. Superheated steam is fed to the line 43 through a line 45 in such proportions as to provide 1 to 12 volumes, specifically 11 volumes, of steam per volume of feed to the dehydrogenation zone. In the preheater 42, the feed is raised to a temperature of 1000° F., and this material is further heated by the superheated steam passing through line 45 so that it enters the reactor 44 at a temperature of 1200° F. It will be understood that the temperature can vary within the limits of 1050 to 1300° F. in the dehydrogenation zone, and that the catalyst therein is an eighth group metal oxide or a mixture of eighth group metal oxides promoted with a material selected from the group consisting of alkali and alkaline earth metal oxides and carbonates.

For example, suitable catalyst compositions are as follows:

(a) 60–95 percent iron oxide, 4–39 percent potassium oxide and 1–10 percent chromium oxide;

(b) 5–60 percent cobalt oxide, 10–60 percent iron oxide, 4–39 percent potassium oxide and 1–10 percent chromium oxide;

(c) 50–90 percent iron oxide, 9–49 percent calcium oxide and 1–4 percent chromium oxide;

As specific catalytic materials, there can be mentioned a catalyst composed of:

(a) 67 percent iron oxide, 30 percent potassium oxide and 3 percent chromium oxide;

(b) 67 percent iron oxide, 30 percent calcium carbonate and 3 percent chromium oxide;

(c) 22 percent iron oxide, 45 percent cobalt oxide, 30 percent potassium carbonate and 3 percent chromium oxide.

The dehydrogenation effluent is quenched to a temperature of 1050° F. by water entering through a quench line 46, the quenched material thence passing through a waste heat boiler 47 when its temperature is reduced to 500° F. and being again quenched to a temperature of 250° F. by water entering through a quench line 48. The quenched effluent passes through a compressor unit 49 and is discharged therefrom into an accumulator vessel 50 at a pressure of 200 pounds per square inch and a temperature of 98° F.

In the accumulator, a liquid fraction is produced which is fed through a line 51 to a depropanizer column 52. A gas fraction formed in the accumulator 50 is passed through a mineral seal oil absorber and stripper 53, of the same type and operated under the same conditions as the unit 19. A residue gas from the absorption column is withdrawn from the unit 53 through a line 54, this residue gas remaining after the absorption of heavier materials by the oil in the unit 53. The product stripped from the rich absorber oil in unit 53 is passed through a line 55 to the column 52 as feed.

From the column 52, material is withdrawn overhead, a part of this material passing through a line 56 and being admixed with the feed to the column 22. The remainder of this material can be passed to a vessel 50 by a line, not shown. A heavier fraction of propane and materials boiling higher than propane is withdrawn through line 57 as a bottom product and fed to a separation system 58 where, in well understood manner, it is separated into a $C_5$ and heavier fraction which is withdrawn through a line 59, a recycle butene fraction which is withdrawn through a line 60, and a butadiene product which is withdrawn through a line 61. Suitable conditions for the operation of the column 52 are a feed temperature of 140° F. a top temperature of 150° F., a bottom temperature of 195° F. and a pressure of 200 pounds per square inch.

It will be understood that the overhead product of column 52 passes through the depropanizer column 22 and deethanizer column 30 and contributes to the residue gas fraction taken overhead from the column 30.

In accordance with the invention, at least a portion of the residue gas fraction is admixed with the feed to the dehydrogenation reactor 44. This residue fraction can consist of the deethanizer overhead fraction from column 30 alone, the residue gas from stripping unit 53, or a mixture of these gases. To any of these fractions, there can be added the residue gas resulting from feeding the overhead of column 18 through the fractionators 22 and 30. This material passes through a line 65 to the line 41 wherein it is admixed with the feed to the dehydrogenation reactor.

Ordinarily, the feed to this reactor varies between 500,000 and 625,000 cubic feet per hour of which 80 to 90 mol percent are butenes and the remainder butane. The residue gas is added in an amount ranging from 1,000 to 18,000 cubic feet per hour with a preferred range of 4,000 to 10,000 cubic feet per hour. Thus, the residue gas should be present in an amount, based on the total feed, of 0.17 to 3.1 mol percent, preferably 0.7 to 1.7 mol percent. Excellent results have been obtained with a total feed of 575,000 cubic feet per hour and a residue gas addition rate of 6,000 cubic feet per hour (1 mol percent).

When operating with a catalyst composed of 67 percent iron oxide, 30 percent potassium oxide and 3 percent chromium oxide, the selectivity, which is defined as mols of butadiene produced per 100 mols of butenes destroyed, increased from 79 to 83 percent without changing the percent conversion, which is defined as mols of butene destroyed per 100 mols charged on a once-through basis. This increase in selectivity resulted, therefore, in a substantial increase in efficiency of the commercial operation.

Moreover, when feeding residue gas to the second dehydrogenation reactor in accordance with the invention, the catalyst life is increased from 25 to 75 percent, and it is found that there is some reduction in the amount of $C_2$ and $C_3$ hydrocarbons formed from the butene feed.

Similar results are obtained with the iron oxide, calcium oxide, chromium oxide catalyst and the iron oxide, cobalt oxide, potassium oxide, chromium oxide, catalyst hereinbefore identified. Accordingly, substantial advantages accrue from operation of the invention in commercial production of butadiene from butenes. Moreover, where the residue gas fraction is obtained partially from the first separation stage (separation of butenes from the effluent of the first dehydrogenation step) and partially from the second separation stage (separation of butadiene from the effluent of the second dehydrogenation reactor) the recovery system can be consolidated so that a single deethanizer column operates on the overhead product of the depropanizer which, in turn, receives feed from both separation stages. Hence, a substantial decrease in capital investment is obtained through such consolidation of the fractionation units.

While the invention has been described in connection with a present, preferred embodiment thereof, it is to be understood that this description is illustrative only and is not intended to limit the invention. In particular, the particular temperatures and pressures of the various separation steps have been presented solely to provide a complete operative working example, and these temperatures and pressures can vary substantially in commercial operation from those given, depending on the nature of the feed, and the operating conditions of the dehydrogenation steps.

We claim:

1. An integrated process for the dehydrogenation of butane to form butadiene and recovery of the resulting butadiene which comprises dehydrogenating butane, fractionating the effluent from the butane dehydrogenation step to form a fraction of butene-1 and higher boiling materials together with a lower boiling fraction, passing the lower boiling fraction to a fractionation zone and therein separating $C_4$ and higher hydrocarbons from said lower boiling fraction, passing the overhead from said last-mentioned fractionation zone to a deethanizing zone wherein ethane is separated from a residue gas fraction, recovering butenes from said butene-1 and higher boiling fraction, passing said butenes as feed through a second dehydrogenation zone together with steam and therein contacting it with an eighth group metal oxide dehydrogenation catalyst promoted with a material selected from the group consisting of alkali and alkaline earth metal oxides and carbonates, passing the effluent from the last-mentioned dehydrogenation zone to a separation zone and therein separating it into a heavy fraction consisting of propane and higher boiling materials together with a light fraction, recovering butadiene from said heavy fraction, passing said light fraction as feed to said fractionation zone, and admixing at least a portion of said residue gas with the feed to said second dehydrogenation zone.

2. An integrated process for the dehydrogenation of butane to form butadiene and recovery of the resulting butadiene which comprises dehydrogenating butane, fractionating the effluent from the butane dehydrogenation step to form a fraction of butene-1 and higher boiling materials together with a lower boiling fraction, passing the lower boiling fraction to a fractionation zone and therein separating propane from said lower boiling fraction, passing the overhead from said last-mentioned fractionation zone to a deethanizing zone wherein ethane is separated from a residue gas fraction, recovering butenes from said butene-1 and higher boiling fraction, passing said butenes as feed through a second dehydrogenation zone together with steam and therein contacting it with an eighth group metal oxide dehydrogenation catalyst promoted with a material selected from the group consisting of alkali and alkaline earth metal oxides and carbonates, compressing the effluent from said second dehydrogenation zone, separating the compressed effluent into a liquid fraction and a vapor fraction, contacting said vapor fraction with an absorption oil, withdrawing a residue gas from the absorption zone, admixing said residue gas with said residue gas fraction and admixing at least a portion of the resulting mixture with the feed to said second dehydrogenation zone, stripping said absorption oil, combining the stripped material with said liquid fraction, separating propane and higher boiling materals from the last-mentoned mixture and recovering butadiene therefrom, and passing the materials lower boiling than propane as feed to said fractionation zone.

References Cited in the file of this patent

UNITED STATES PATENTS

| | | |
|---|---|---|
| 2,379,332 | Arnold | June 26, 1945 |
| 2,458,082 | Kilpatrick | Jan. 4, 1949 |
| 2,500,353 | Gantt | Mar. 14, 1950 |
| 2,554,054 | Owen | May 22, 1951 |
| 2,666,086 | Pitzer | Jan. 12, 1954 |
| 2,750,435 | Fetchin | June 12, 1956 |